United States Patent [19]

Louzos

[11] 3,901,730

[45] Aug. 26, 1975

[54] CATHODE MIX FOR SOLID ELECTROLYTE DEVICE

[75] Inventor: Demetrios V. Louzos, Rocky River, Ohio

[73] Assignee: Union Carbide Corporation, New York, N.Y.

[22] Filed: May 1, 1974

[21] Appl. No.: 465,993

Related U.S. Application Data

[60] Division of Ser. No. 384,302, July 31, 1973, abandoned, which is a continuation of Ser. No. 92,830, Nov. 25, 1970, abandoned.

[52] U.S. Cl. ............ 136/83 R; 136/100 R; 136/137
[51] Int. Cl. .......................................... H01m 13/00
[58] Field of Search...... 136/137, 153, 83 R, 100 R, 136/20, 121, 6 LF, 120 FC, 120 R

[56] References Cited
UNITED STATES PATENTS 2,894,052   7/1959   Evans................................ 136/83 R
3,415,687   12/1968  Methlie............................ 136/100 R
3,443,997   5/1969   Argue et al. ....................... 136/83 R

FOREIGN PATENTS OR APPLICATIONS 831,060   3/1960   United Kingdom................. 136/137

Primary Examiner—Anthony Skapars
Attorney, Agent, or Firm—C. F. O'Brien

[57] ABSTRACT

A cathode mix for solid electrolyte cells contains electronically conductive material, the selected electrolyte, which has an ionic conductivity of at least $1 \times 10^{-3}$ ohm$^{-1}$ cm$^{-1}$ at cell operating temperature, and active cathode material composed of an oxygen rich material having a reducible element which upon reduction yields at least two electrons. The active cathode material is represented by the formula $X_a.Y_b.O_c$ wherein X is an element of Groups 1a and 2a, Y is a halogen or a member of the group Mn, Cr, Pb, Fe and Se and O is oxygen.

5 Claims, No Drawings

CATHODE MIX FOR SOLID ELECTROLYTE DEVICE

This is a division of application filed under Rule 60 Ser. No. 384,302 filed July 31, 1973, now abandoned, which in turn was a continuation of application Ser. No. 92,830 filed Nov. 25, 1970, now abandoned.

This invention relates to solid state battery systems and refers more paricularly to cathodes for such systems.

The theoretical advantages of battery systems composed of solid materials only have been discussed in the art for many years. Much effort has been expended to provide cells which attain the advantages theoretically possible, but the goal has been elusive insofar as wide commercial acceptance is concerned. Among the reasons for the limited use of solid state cells may be cited their cost and their relatively low power output. In attempts to improve power output, more and more active materials have been suggested for use as anodes, electrolytes and cathodes. While improvement has been attained in power output, the gain has been achieved at the expense of added materials cost.

Thus, much effort has been expended to provide solid materials having high enough ionic conductivity to render them serviceable as electrolytes. Considerable progress has been made in this direction, but many of the materials are costly, particularly those containing relatively large quantities of silver. Some of the electrolyte compositions reported require the use of active metal anodes and complex cathode materials, further adding to the cost of the cells. In many instances the cathodes used have been a limiting factor in output of the cells.

It is the principal object of the invention to provide cathodes for solid state batteries which are useful with a variety of anodes and solid electrolytes and which make possible the production of solid state cells of improved power output.

The invention by means of which this object is attained comprises a cathode mix containing solid ionically conductive electrolyte, finely divided electronic conductive material, and a stable oxygen containing compound containing a reducible element which upon reduction in cell environment yields at least two electrons, the compound being characterized by a half cell electrode potential of at least +1.15 volts. The cathode mix contains about 10% to 90% by weight of the compound, referred to as "active cathode material," 5% to 30% by weight of electronically conductive material; and 5% to 60% by weight (or the remainder) of electrolyte.

The electrolyte in the cathode mix should be the electrolyte used in the cell system for which the cathode mix is intended. It should have an ionic conductivity of at least $1 \times 10^{-3}$ ohm$^{-1}$ cm$^{-1}$ at cell operating temperatures which may be room temperature or higher depending upon the characteristics of the electrolyte. Electrolytes suitable for use with the cathode mix of the invention will be discussed in more detail below.

The electronically conductive material used in the cathode mix may be any of the materials conventionally used for the purpose. Finely divided graphite or a black such as acetylene black or mixtures of graphite and black are entirely suitable in most cases. For some cells it may be desirable to utilize finely divided metal compatible with other cell components.

The active cathode material may be an oxide or a salt. It must be stable and may be water-soluble since no water is present in the cells for which the cathode mix is intended. The critical properties it must possess in accordance with the invention are its capability of providing at least two electrons in the cell reaction and its half cell electrode potential of at least 1.15 volts as measured in aqueous acid solution of unit activity and at room temperature and pressure.

The composition of the active cathode material is conveniently represented by the formula $X_a.Y_b.O_c$. In this representation "X" is an element selected from Groups 1a and 2a of the periodic classification of the elements. For purposes of the invention the ammonium ion ($N^+H_4^+$) is included. Preferred elements are hydrogen, lithium, sodium, potassium, calcium, barium, strontium, and magnesium. The expression "Y" in the formula includes the halogens, iodine, chlorine and bromine; the metals manganese, chromium, lead, iron; and selenium. The expression "O" represents oxygen.

In the formula the subscripts, "$a$", "$b$" and "$c$" represent the number of atoms of X, Y and O present in the compound respectively, $a$ being 0 to 2, $b$ being 1 to 2 and $c$ being 2 to 7 and at least equal to $b + 1$.

Specific compounds which are suitable for use in the invention include iodic acid ($HIO_3$); iodic acid anhydride ($I_2O_5$); potassium permanganate ($KM_nO_4$); potassium dichromate ($K_2Cr_2O_7$); ammonium persulfate (($NH_4)_2S_2O_8$); barium persulfate ($BaS_2O_8$); magnesium metaplumbate ($MgPbO_3$); barium ferrate ($BaFeO_4$); magnesium perchlorate ($Mg(ClO_4)_2$); potassium selenate ($K_2SeO_4$); potassium chlorate ($KClO_3$); potassium bromate ($KBrO_3$); chromic oxide ($CrO_3$) and lead dioxide ($PbO_2$).

In Table I are set forth active cathode materials for use in this invention showing the reduction reactions, electron yield and half cell potentials of the materials. In the table the cation in many compounds is identified merely as "X" as in the above formula. The subscript "$a$" is equal to the valence of the anion necessary to secure electrical neutrality of the compound.

TABLE I

| Active Cathode Material | Reduction Reaction | | | Electron Yield | Half Cell Potential* |
|---|---|---|---|---|---|
| $HIO_3$ | $+5$ I | → | $0$ I | 5 | +1.195 |
| $I_2O_5$ | $+5$ I | → | $0$ I | 5 | 1.195 |
| $CrO_3$ | $+6$ Cr | → | $+3$ Cr | 3 | 1.33 |
| $PbO_2$ | $+4$ Pb | → | $+2$ Pb | 2 | 1.455 |
| $X_aMnO_4$ | $+7$ Mn | → | $+2$ Mn | 5 | 1.51 |
| $X_aCr_2O_7$ | $+6$ 2Cr | → | $+3$ 2Cr | 6 | 1.33 |
| $X_aS_2O_8$ | $+7$ 2S | → | $+6$ 2S | 2 | 2.01 |
| $Y_aPbO_3$ | $+4$ PB | → | $+2$ Pb | 2 | 1.455 |
| $Y_aFeO_4$ | $+6$ Fe | → | $+3$ Fe | 3 | 2.2 |
| $X_aClO_4$ | $+7$ Cl | → | $+5$ Cl | 2 | 1.19 |
| $X_aSeO_4$ | $+6$ Se | → | $+4$ Se | 2 | 1.15 |
| $X_aClO_3$ | $+5$ Cl | → | $+3$ Cl | 2 | 1.21 |
| $X_aBrO_3$ | $+5$ Br | → | $0$ Br | 5 | 1.52 |

*As measured in aqueous acid solution

Consideration of the information in Table I indicates that of active cathode materials listed $HIO_3$ (and $I_2O_5$) provides the highest electron yield per atom of "Y" upon reduction. Accordingly it is a preferred material, and as is shown by data below, its use produces highly effective cells. Other preferred materials for the cathode mix of the invention are $CrO_3$ and $X_aCr_2O_7$.

As study of the formula recited above will show, other cation metals can be substituted for those in the specific compounds mentioned. However, as will be apparent to those skilled in the art, certain compounds are too unstable for safe use, for instance ammonium chlorate and ammonium perchlorate. Moreover, care should be taken in using a specific active cathode mateial that the cathode mix prepared is itself stable. With some active cathode materials, for example, sodium chlorate, the use of finely divided carbonaceous material as electronic conductor should be avoided because of explosion hazard.

In making cells utilizing the cathode mix of the invention, the cathode mix may be prepared by mixing the comminuted constituents and compressing them on a suitable support for instance a foil of nickel or other metal or of graphite which may serve as the cathode collector. A layer of solid electrolyte is placed on the cathode mix, and a sheet of anode metal placed on the electrolyte layer. Instead of a sheet of anode metal an anode mix of powdered anode metal, electrolyte and graphite may be employed. In such case an anode collector such as a foil of graphite or metal may be used. The cell is preferably encapsulated in plastic, for example polytrifluorochloroethylene, provision being made for making electrical connection to anode and cathode collector. The following specific examples will serve to illustrate the technique.

EXAMPLE I

A cathode mix containing 3.426 grams of $HIO_3$; 0.468 gram finely divided graphite; 0.04 gram acetylene black; and 0.932 gram of electrolyte of the composition 3 mols $KNO_3$ to 1 mol of $Li_2SO_4$ was prepared. A layer 0.02 inch thick of electrolyte of the composition 3 $KNO_3$ — $1Li_2SO_4$ was applied to the mix. Two layers of lithium sheet each 0.075 gram in weight were applied to the electrolyte layer as the anode of the cell.

EXAMPLE II

A cathode mix containing 1.713 grams $HIO_3$; 0.466 gram of electrolyte of 3 $KNO_3$ — $Li_2SO_4$ formulation; 0.234 gram graphite and 0.02 gram acetylene black was prepared. A layer 0.02 inch thick of electrolyte was applied to it as in Example I. Instead of two sheets of lithium as in Example I, a layer of anode mix containing 0.322 gram of lithium powder; 0.340 gram of the electrolyte; 0.230 gram of graphite and 0.021 gram of acetylene black was applied to the electrolyte and a single sheet of lithium was placed in contact with the anode mix to complete the cell.

EXAMPLE III

A cathode mix of 2.0 grams $PbO_2$; 0.7 gram comminuted graphite; 0.02 gram acetylene black and about 1.5 grams of electrolyte of composition $3KNO_3$ — $Li_2SO_4$ was prepared by mixing and pressing the constituents. To it was applied a layer of 0.02 inch thick and about 1 gram in weight of electrolyte of the $3KNO_3$ — $Li_2SO_4$ composition. A sheet of Li 0.01 inch thick completed the cell when placed in contact with the electrolyte layer. The cell components were encapsulated in polytrifluorochloroethylene.

EXAMPLE IV

A cathode mix containing ammonium persulfate $((NH_4)_2 S_2O_8)$ electrolyte, graphite and acetylene black in proportions similar to the proportions set forth in previous examples was prepared. An electrolyte was prepared by melting together (at about 400°C.) $Li_2SO_4$, $KNO_2$ and $NaNO_2$ in molar proportions of 1, 1.5 and 1.5 respectively, solidifying and finely grinding the solidified melt. A layer of the finely ground electrolyte material was deposited on the cathode mix. A lithium sheet anode was placed in contact with the electrolyte layer to complete the cell.

A number of cells have been prepared in similar manner to that set forth in Examples I to IV utilizing other cathode mixes embodying the invention in combination with a variety of anodes and solid electrolytes. Representative data obtained in tests of such cells are set forth in the following table which also shows the cell systems, that is, anode, electrolyte and cathode.

TABLE II

OPEN CIRCUIT VOLTAGE (O.C.V.) AND CLOSED CIRCUIT VOLTAGE (C.C.V.) OF SOLID ELECTROLYTE CELLS AT CELL OPERATING TEMPERATURES

Electrolyte: $3KNO_3$ - $Li_2SO_4$

| Anode | Cathode | Temp.°C. | O.C.V. | C.C.V. 1000 Ohms | C.C.V. 500 Ohms |
|---|---|---|---|---|---|
| Li | $HIO_3$ | >135 | 4.2 | 3.5 | 3.3 |
| Li | $I_2O_5$ | " | 4.0 | 2.0 | 1.5 |
| Sr | $HIO_3$ | " | 3.5 | — | — |
| Ca | $HIO_3$ | " | 2.6 | 1.0 | — |
| Mg | $HIO_3$ | " | 2.3 | 2.1 | — |
| Zn | $HIO_3$ | " | 1.8 | 1.4 | — |
| Li | $KMnO_4$ | 176 | 3.7 | 1.6 | 1.1 |
| Li | $K_2Cr_2O_7$ | 135 | 3.45 | 3.4 | 2.7 |
| Li | $PbO_2$ | 155 | 3.2 | 3.15 | 3.1 |
| Li | $CrO_3$ | 146 | 3.85 | 3.8 | 3.7 |

Electrolyte: $Li_2SO_4$ - $KNO_2$

| Anode | Cathode | Temp.°C. | O.C.V. | C.C.V. |
|---|---|---|---|---|
| Li | $HIO_3$ | >90 | 3.4 | |
| Li | $K_2Cr_2O_7$ | 130 | 3.3 | |

TABLE II -Continued

Other Electrolytes

| Anode | Electrolyte | Cathode | Temp. | O.C.V. | C.C.V. 1000 Ohms | C.C.V. 500 ohms |
|---|---|---|---|---|---|---|
| Li | Li$_2$SO$_4$ - KNO$_2$- NaNO$_2$ | (NH$_4$)$_2$S$_2$O$_8$ | 105 | 3.2 | 2.3 | 1.8 |
| Ag | KAg$_4$ICN | HIO$_3$ | 25 | 0.65 | — | — |
| Ag | 4AgI-KI- Zn(CN)$_2$ | HIO$_3$ | 25 | 0.69 | — | — |
| Ag | RbAg$_4$I$_5$ | HIO$_3$ | 25 | 0.62 | — | — |

From the data in Table II it will be observed that cells utilizing the cathode mix of the invention with electrolytes of good ionic conductivity have quite high open circuit voltages. Voltage under load is also shown to be relatively high, indicating that the cells have good power output. Other tests have verified these findings.

For example, a cell of the system Li/3KNO$_3$—Li$_2$SO$_4$/HIO$_3$ which had an open circuit voltage of 4.2, when continuously discharged across a resistance of 1,000 ohms for 21 hours at 173°C. showed a voltage above 3.0 volts for 15 hours. After 21 hours under these conditions the cell voltage was about 2.3 volts. In another test a cell of the system Li/3KNO$_3$—Li$_2$SO$_4$/CrO$_3$ which had an open circuit voltage of 3.85 volts was tested under increasingly heavy drain. In this test the load was applied for 12 seconds at each stage before the voltage was read. Results of tests on fresh cells are tabulated in Table III. Similar results were obtained in tests on cells after storage for 4-5 months at room temperatures.

TABLE III

| Resistance - Ohms | Voltage - Volts |
|---|---|
| 100,000 | 3.85 |
| 10,000 | 3.85 |
| 1,000 | 3.8 |
| 500 | 3.7 |
| 300 | 3.5 |
| 100 | 2.9 |
| 50 | 2.4 |
| 10 | 0.9 |

Thus, the data observed in tests of cells utilizing the cathode mix of the invention indicate that with such a mix a cell capable of producing high current density is available. Although a wide variety of solid electrolytes may be used with the cathode mix, it is apparent that the best combination of properties can be attained with the most ionically conductive electrolyte materials. As above indicated, the electrolyte should have a specific conductance at cell operating temperature of at least $1 \times 10^{-3}$ ohm$^{-1}$ cm$^{-1}$.

Suitable electrolytes include binary silver iodide-silver sulfide compositions; binary silver iodide-potassium iodide compositions; binary silver iodide-alkali metal compositions; and ternary silver iodide-transition metal iodide and cyanide compositions as well as those specifically referred to in Examples I to IV and Table II. The potassium nitrate-lithium sulfate electrolytes are of especial interest since they are high resistance conductors at room temperatures but have good ionic conductivity at temperatures above about 130°C. These electrolyte compositions are disclosed in the application of G. W. Mellors filed concurrently herewith and assigned to the assignee of this application.

Anodes suitable for use in cells containing the cathode mix of the invention may be of any metal or alloy compatible with the active cathode material and electrolyte. Suitable are lithium, zinc, aluminum, magnesium, calcium and strontium.

It will be apparent from the foregoing that the specific examples discussed herein in detail illustrate the principles of the invention and demonstrate the variety of materials that when used with the cathode mix of the invention provide solid electrolyte battery systems of good power output.

What is claimed is:

1. A cathode mix for a solid electrolyte cell which mix contains finely divided electronically conductive material, comminuted ionically conductive cell electrolyte having a specific conductance of at least $1 \times 10^{-3}$ ohm$^{-1}$ cm$^{-1}$ at cell operating conditions, and, an active cathode material selected from the group consisting of the compounds I$_2$O$_5$ and CrO$_3$.

2. A cathode mix as defined by claim 1 containing 10% to 90% of active cathode material and 5% to 30% of electronically conductive material; the remainder being ionically conductive electrolyte.

3. A cathode mix as defined in claim 2 wherein said electronically conductive material is a mixture of finely divided graphite and acetylene black.

4. A cathode mix as defined by claim 1 wherein said active cathode material is CrO$_3$.

5. A cathode mix as defined by claim 1 wherein said active cathode material is I$_2$O$_5$.

* * * * *

UNITED STATES PATENT OFFICE
CERTIFICATE OF CORRECTION

Patent No. 3,901,730    Dated August 26, 1975

Inventor(s)  D. V. Louzos

It is certified that error appears in the above-identified patent and that said Letters Patent are hereby corrected as shown below:

Column 2, line 17, "(N+H4+)" should read -- $(NH_4)^{++}$ --.

Column 5, Table II, "500 hms" should read -- 500 Ohms --.

Signed and Sealed this twenty-seventh Day of January 1976

[SEAL]

Attest:

RUTH C. MASON
Attesting Officer

C. MARSHALL DANN
Commissioner of Patents and Trademarks